United States Patent
Lim et al.

(10) Patent No.: US 9,307,494 B2
(45) Date of Patent: Apr. 5, 2016

(54) APPARATUS AND METHOD FOR SELECTING PROCESSING SPEED OF PROCESSOR AND WIRELESS NETWORK

(71) Applicants: LG Electronics Inc., Seoul (KR); INDUSTRY-ACADEMIC COOPERATION FOUNDATION, YONSEI UNIVERSITY, Seoul (KR)

(72) Inventors: Jaewon Lim, Anyang-si (KR); Jihwan Kim, Daejeon (KR); Song Chong, Daejeon (KR); Jeonghoon Mo, Seoul (KR); Byounghoon Kim, Anyang-si (KR); Jungho Kwak, Daejeon (KR)

(73) Assignees: INDUSTRY-ACADEMIC COOPERATION FOUNDATION, YONSEI UNIVERSITY, Seoul (KR); LG ELECTRONICS INC., Seoul (KR)

( * ) Notice: Subject to any disclaimer, the term of this patent is extended or adjusted under 35 U.S.C. 154(b) by 282 days.

(21) Appl. No.: 14/055,664

(22) Filed: Oct. 16, 2013

(65) Prior Publication Data

US 2014/0106827 A1   Apr. 17, 2014

Related U.S. Application Data

(60) Provisional application No. 61/715,262, filed on Oct. 17, 2012.

(51) Int. Cl.
*H04W 52/02* (2009.01)
*G06F 9/00* (2006.01)

(52) U.S. Cl.
CPC ............. *H04W 52/0251* (2013.01); *G06F 9/00* (2013.01); *H04W 52/0287* (2013.01); *Y02B 60/50* (2013.01)

(58) Field of Classification Search
CPC .............................. H04W 52/0251; G06F 9/00
See application file for complete search history.

(56) References Cited

U.S. PATENT DOCUMENTS

| | | | | |
|---|---|---|---|---|
| 7,610,499 B2* | 10/2009 | Zdravkovic | ........... | G06F 1/3203 713/300 |
| 8,699,467 B2* | 4/2014 | Lindoff | ................. | H04L 5/0053 370/332 |
| 2010/0202382 A1* | 8/2010 | Park | ...................... | H04L 5/0053 370/329 |
| 2012/0250571 A1* | 10/2012 | Andrews | ............... | H04L 47/627 370/253 |
| 2013/0279372 A1* | 10/2013 | Jain | ........................ | H04W 4/06 370/254 |
| 2014/0024416 A1* | 1/2014 | Xie | ................... | H04W 52/0261 455/574 |
| 2014/0064165 A1* | 3/2014 | Chung | .................. | H04W 52/02 370/311 |

* cited by examiner

*Primary Examiner* — Andrew Wendell
*Assistant Examiner* — Maryam Soltanzadeh
(74) *Attorney, Agent, or Firm* — Lee Hong Degerman Kang & Waimey; Jonathan Kang; Jeffrey Lotspeich (57) ABSTRACT

An apparatus and method for selecting a processor clock speed and a wireless network are disclosed. The method for selecting a processing speed of a processor and/or a wireless network to be connected in a User Equipment (UE) in a wireless communication system includes detecting states of a processor-related queue and a network module-related queue, and selecting a processing speed of the processor-related queue and/or a wireless network to be connected, based on the detected states of the processor-related queue and the network module-related queue and power consumptions of a processor and a network module. The processing speed of the processor-related queue and/or the wireless network to be connected are selected to keep a difference between a length of the processor-related queue and a length of the network module-related queue at a predetermined value and minimize the power consumptions of the processor and the network module.

12 Claims, 5 Drawing Sheets

APPARATUS AND METHOD FOR SELECTING PROCESSING SPEED OF PROCESSOR AND WIRELESS NETWORK

Pursuant to 35 U.S.C. §119(e), this application claims the benefit of U.S. Provisional Application Ser. No. 61/715,262, filed on Oct. 17, 2012, the contents of which are hereby incorporated by reference in their entirety.

BACKGROUND OF THE INVENTION

1. Field of the Invention

The present invention relates to an apparatus and method for use in a wireless communication system, and more particularly, to an apparatus and method for selecting a processor clock speed and a wireless network.

2. Discussion of the Related Art

Network Selection

Studies have actively been conducted on selection of a wireless network through which data is to be transmitted or determination as to whether to wait for a better network by delay tolerance, when a User Equipment (UE) transmits data to a server in a heterogeneous network environment. Particularly, a study revealed that delay tolerance can improve performance in terms of network capacity or energy due to trade-off. In application of delay tolerance to offloading, if a UE cannot immediately access a Wireless Fidelity (Wi-Fi) network for a specific application insensitive to delay, such as synchronization or transmission of a large file, the UE may enter a Wi-Fi access area by mobility after an allowed delay without data transmission and then may transmit data through the Wi-Fi network. This operation is called delayed offloading, which is a recent extensive research area.

Dynamic Voltage Scaling and Frequency Scaling (DVFS) in Smartphone

Figure 1:
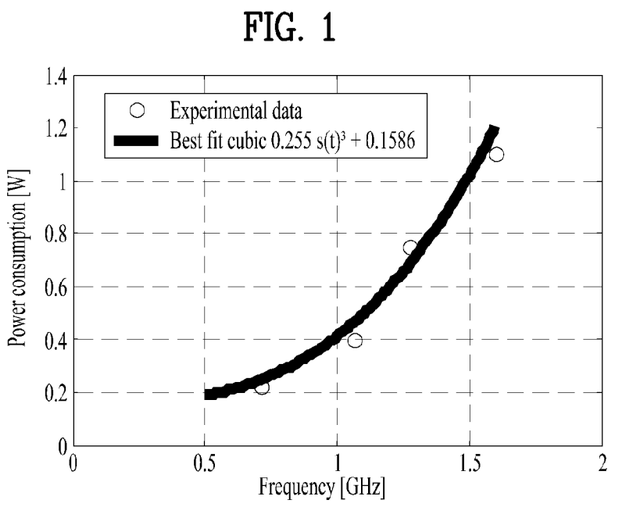
FIG. 1 illustrates a relationship between Central Processing Unit (CPU) clock frequencies and power consumption.

Owing to the rapidly increased performance of recent smartphones, the maximum clock speed of a Central Processing Unit (CPU) is increasing significantly. However, most of applications do not require a maximum CPU clock speed. Therefore, recent smartphone chipsets save power by controlling a CPU clock according to a UE load or an application type. Power consumption is calculated based on a CPU clock frequency and a supply voltage by $P=\alpha V^2 f$+Leakage power ($\alpha$ is a modeling constant for components other than power and voltage, V is the supply voltage, and f is the CPU clock frequency). Since the supply voltage changes along with the CPU clock in DVFS, a CPU clock-power consumption curve as illustrated in FIG. 1 may be obtained.

However, because most of applications in smartphones are used through a network, there are limitations in determining DVFS based on a CPU load alone. Accordingly, there exists a need for a DVFS scheme taking into account both a network load and a CPU load.

SUMMARY OF THE INVENTION

Accordingly, the present invention is directed to an apparatus and method for selecting a processor clock speed and a wireless network that substantially obviate one or more problems due to limitations and disadvantages of the related art.

An object of the present invention is to provide a method for selecting a data processing speed and a wireless network, taking into account data processing speeds and power consumptions of the data processing speeds.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for selecting a processing speed of a processor and/or a wireless network to be connected in a User Equipment (UE) in a wireless communication system includes detecting states of a processor-related queue and a network module-related queue, and selecting a processing speed of the processor-related queue and/or a wireless network to be connected, based on the detected states of the processor-related queue and the network module-related queue and power consumptions of a processor and a network module. The processing speed of the processor-related queue and/or the wireless network to be connected are selected to keep a difference between a length of the processor-related queue and a length of the network module-related queue at a predetermined value and minimize the power consumptions of the processor and the network module.

Preferably, a period of selecting the processing speed of the processor-related queue may be shorter than a period of selecting the wireless network to be connected.

Preferably, the method may further include measuring a channel state of at least one candidate wireless network to select the wireless network to be connected.

Preferably, the processing speed of the processor-related queue, $s(\tau)$ may be selected to minimize $$VP^p(s(\tau)) - 2Q^p(\tau)\frac{s(\tau)}{\lambda} + 2Q^n(\tau)\min\left(\frac{s(\tau)}{\lambda}, Q^p(\tau)\right)$$

where V is an energy-delay trade-off parameter, $P^p(s(\tau))$ is a power consumption of the processor at the processing speed $s(\tau)$, $Q^p(\tau)$ is a length of the processor-related queue at time $\tau$, $\lambda$ is the number of cycles per bit that the processor can process, $Q^n(\tau)$ is a length of the network module-related queue at time $\tau$, and min(A, B) is a smaller value between A and B.

Preferably, the wireless network to be connected to the UE, $l(\tau)$ may be selected to minimize $VP^n(l(\tau))-2Q^n(\tau)\mu_l(\tau)$ where V is an energy-delay tradeoff parameter, $P^n(l(\tau))$ is a power consumption of the network module in the wireless network $l(\tau)$ at time $\tau$, $Q^n(\tau)$ is a length of the network module-related queue at time $\tau$, and $\mu_l(\tau)$ is a transmission rate of the wireless network $l(\tau)$ at time $\tau$.

In another aspect of the present invention, a UE for selecting a processing speed of a processor and/or a wireless network to be connected in a wireless communication system includes a Radio Frequency (RF) unit, and a processor configured to control the RF unit. The processor may be configured to detect states of a processor-related queue and a network module-related queue, and select a processing speed of the processor-related queue and/or a wireless network to be connected, based on the detected states of the processor-related queue and the network module-related queue and power consumptions of the processor and a network module, and the processor may be configured to select the processing speed of the processor-related queue and/or the wireless network to be connected to keep a difference between a length of the processor-related queue and a length of the network module-related queue at a predetermined value and minimize the power consumptions of the processor and the network module.

Preferably, a period of selecting the processing speed of the processor-related queue may be shorter than a period of selecting the wireless network to be connected.

Preferably, the processor may measure a channel state of at least one candidate wireless network to select the wireless network to be connected.

Preferably, the processor may select the processing speed of the processor-related queue, $s(\tau)$ to minimize $$VP^p(s(\tau)) - 2Q^p(\tau)\frac{s(\tau)}{\lambda} + 2Q^n(\tau)\min\left(\frac{s(\tau)}{\lambda}, Q^p(\tau)\right)$$

where V is an energy-delay tradeoff parameter, $P^p(s(\tau))$ is a power consumption of the processor at the processing speed $s(\tau)$, $Q^p(\tau)$ is a length of the processor-related queue at time $\tau$, $\lambda$ is the number of cycles per bit that the processor can process, $Q^n(\tau)$ is a length of the network module-related queue at time $\tau$, and min(A, B) is a smaller value between A and B.

Preferably, the processor may select the wireless network to be connected to the UE, $l(\tau)$ to minimize $VP^n(l(\tau))-2Q^n(\tau)\mu_l(\tau)$ where V is an energy-delay tradeoff parameter, $P^n(l(\tau))$ is a power consumption of the network module in the wireless network $l(\tau)$ at time $\tau$, $Q^n(\tau)$ is a length of the network module-related queue at time $\tau$, and $\mu_l(\tau)$ is a transmission rate of the wireless network $l(\tau)$ at time $\tau$.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as Institute of Electrical and Electronics Engineers (IEEE) IEEE 802.11 (Wireless Fidelity (Wi-Fi)), IEEE 802.16 (Worldwide interoperability for Microwave Access (WiMAX)), IEEE 802.20, Evolved-UTRA (E-UTRA) etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE and LTE-A systems. However, the technical features of the present invention are not limited thereto. Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) is fixed or mobile. The UE is a device that transmits and receives user data and/or control information by communicating with a Base Station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', 'point', 'Transmission Point (TP)', 'Reception Point (RP)', 'DownLink (DL) point', 'UpLink (UL) point', 'cell', etc.

Figure 2:
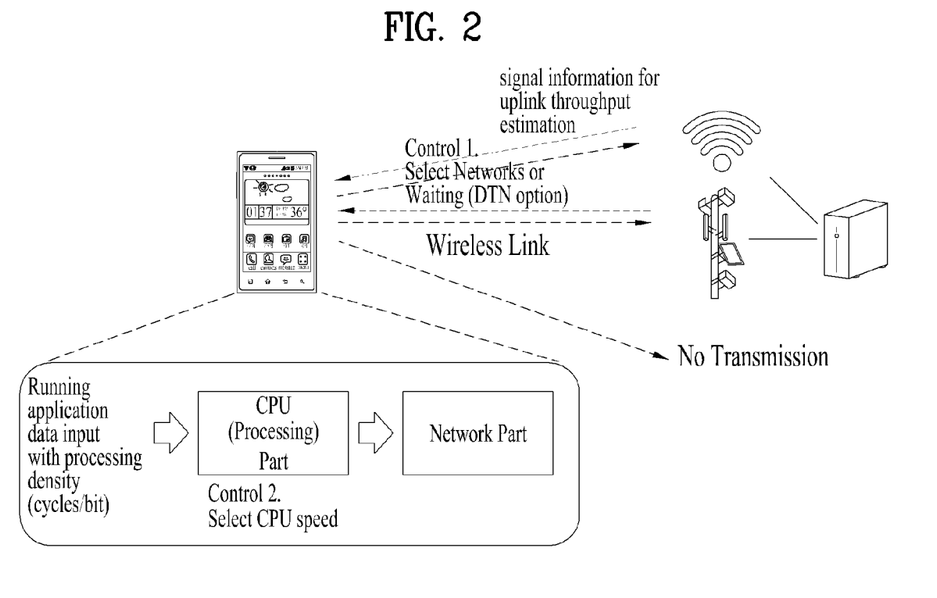
FIG. 2 illustrates an exemplary configuration of a wireless communication system to which an embodiment of the present invention is applicable.

FIG. 2 illustrates an exemplary configuration of a wireless communication system to which an embodiment of the present invention is applicable. In an embodiment of the present invention, it is assumed that a smartphone includes a plurality of network modules operating in a heterogeneous network environment and can utilize a heterogeneous network, use an application, and control a Central Processing Unit (CPU) clock in the wireless communication system.

When an application is executed in a UE, a cycle in which a CPU can process one bit is determined according to the characteristics of the application. This is called a processing density. Data to be processed by the application is input to the CPU and a network part selects an appropriate wireless network and transmits data processed by the CPU to a server through the selected wireless network.

There are two control parameters on the part of the UE. One is appropriate network selection and the other is CPU clock control. An option of delaying transmission according to the characteristics of an application may be added in wireless network selection. To select an appropriate wireless network, the current states of wireless networks should be estimated. For this purpose, a cellular BS or a Wi-Fi AP should broadcast appropriate information to UEs.

Figure 3:
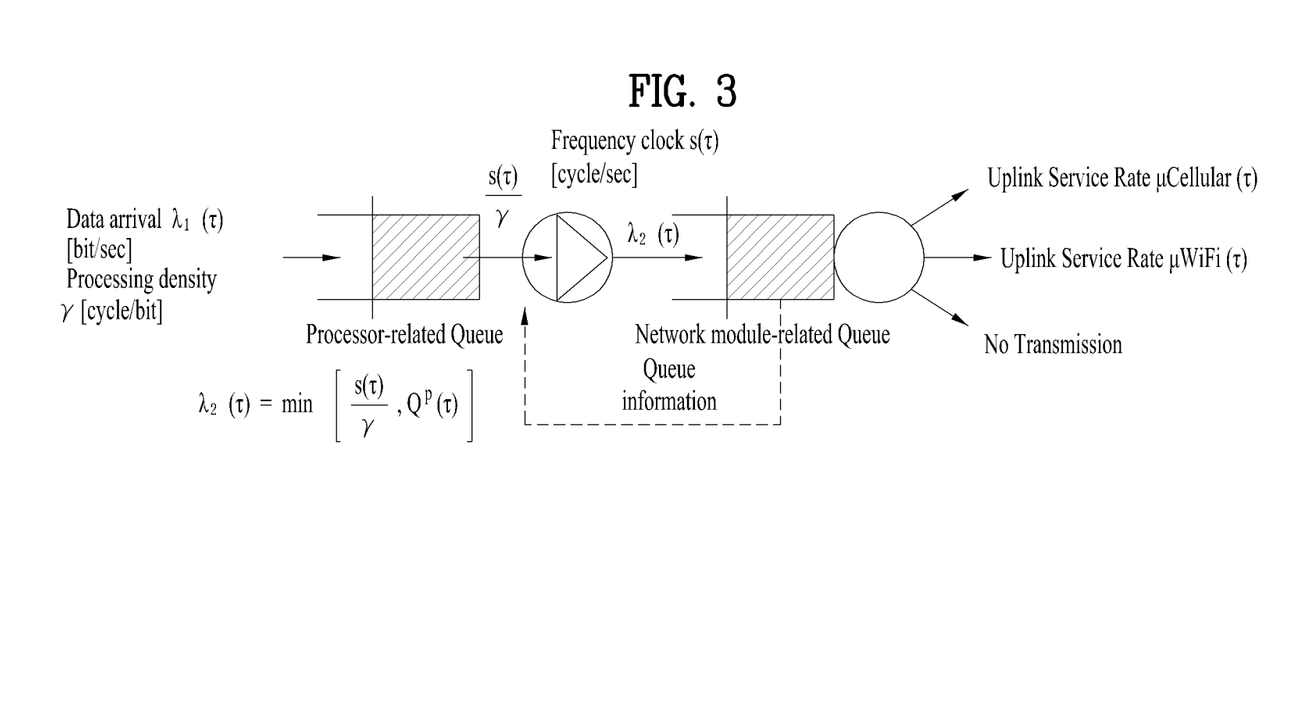
FIG. 3 illustrates an exemplary model of a wireless communication system according to an embodiment of the present invention.

FIG. 3 illustrates an exemplary model of a wireless communication system according to an embodiment of the present invention. A processor module (e.g. a CPU) and a network module (e.g. a Radio Frequency (RF) unit) are modeled as queues. It is assumed herein that a CPU-related queue (i.e. a processor-related queue) and a network module-related queue share queue information. The CPU-related queue receives data and outputs data. The output data of the CPU-related queue is provided as an input to the network module-related queue. Then the network module-related queue selects a wireless network through which to transmit the data according to the states of wireless networks and outputs the data through the selected wireless network.

In this case, let the rate of data input to the CPU-related queue be denoted by $\lambda_1(\tau)$ (bits per second) and a processing density available to the CPU or the CPU-related queue be denoted by $\gamma$ (cycles per bit). In addition, let the clock speed of the CPU be denoted by $s(\tau)$ (cycles per second) and the rate of data output from the CPU-related queue or the rate of data input to the network module-related queue be denoted by $\lambda_2(\tau)$ (bits per second). The output data rate of the network module-related queue is different in each wireless network. In FIG. 3, three exemplary networks are given: cellular network, Wi-Fi network, and network without UL transmission. The data rate is $\mu_{cellular}(\tau)$ in the cellular network and $\mu_{WiFi}(\tau)$ in the Wi-Fi network. In this state, the lengths (or states) of the CPU-related queue and the network module-related queue, which vary in every unit time, may be modeled as the following equations.

$$Q^p(\tau+1) = \left[Q^p(\tau) - \frac{s(\tau)}{\gamma}\right]^+ + \lambda_1(\tau) \quad \text{[Equation 1]}$$

$$Q^n(\tau+1) = [Q^n(\tau) - \mu_l(\tau) - \mu_l(\tau)]^+ + \lambda_2(\tau) \quad \text{[Equation 2]}$$

$Q^p(\tau+1)$ represents the length (or state) of the CPU-related queue at time $\tau+1$ and $Q^n(\tau+1)$ represents the length (or state) of the network module-related queue at time $\tau+1$.

The power consumption of each module may be modeled as follows. $\mu_i(\tau)$ represents the output data rate of the network module-related queue at time $\tau$.

$$P^p(\tau) = \alpha s(\tau)^3 + \beta \quad \text{[Equation 3]}$$

$$P^n(\tau) = P(l)(\tau)) \quad \text{[Equation 4]}$$

$P^p(\tau)$ represents power consumed in the processor module and $P^n(\tau)$ represents power consumed in the network module.

Figure 4:
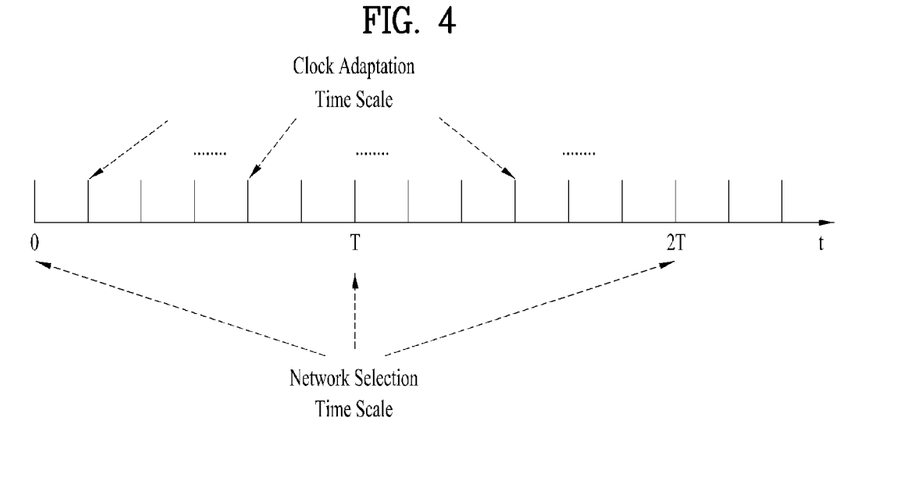
FIG. 4 illustrates a time scale for CPU clock adaptation and a time scale for network selection.

A time scale for controlling a CPU clock speed and a time scale for changing network selection should be different. This is because although the CPU clock speed can be adapted fast, fast changing of network selection requires additional consideration of vertical handover-incurred delay and power consumption. Therefore, it is assumed that a time scale for network selection is longer than a time scale for CPU clock speed adaptation in order to ignore the influence of the time delay and power consumption. FIG. 4 illustrates a time scale for CPU clock adaptation and a time scale for network selection.

For CPU clock speeds, there are a finite number of incontiguous selection modes and network selection is expressed as follows.

$$s(\tau) \in \{s_{min}, s_1, s_2, \ldots s_{max}\} \quad \text{[Equation 5]}$$

$$l(t) \in \{0, \text{WiFi}, \text{Cellular} \ldots\} \quad \text{[Equation 6]}$$

The following equation describes an objective function of minimizing power consumption in each module and keeping the length of a queue related to each module to be finite based on the exemplary modeling of FIG. 3.

$$\min P_{ave} = \lim_{T_{max} \to \infty} \frac{1}{T_{max}} \sum_{t=0}^{T_{max}-T} \sum_{\tau=0}^{i+T-1} (P^{(p)}(\tau) + P^{(n)}(\tau)) \quad \text{[Equation 7]}$$

$$\text{Subject to } \lim_{\tau \to \infty} \frac{\mathbb{E}\{|Q^{(p)}(\tau) + Q^{(n)}(\tau)|\}}{\tau} = 0$$

When the UE receives input data that can be processed, the overall average power consumption of the processor module and the network module is minimized. The optimal solution of the above objective function is verified and obtained by the inventor(s) of the application, as follows.

$$\min_{s(\tau)} VP^p(s(\tau)) - 2Q^p(\tau)\frac{s(\tau)}{\lambda} + 2Q^n(\tau)\min\left(\frac{s(\tau)}{\lambda}, Q^p(\tau)\right) \quad \text{[Equation 8]}$$

$$\min_{l(\tau)} VP^n(l(\tau)) - 2Q^n(\tau)\mu_l(\tau) \quad \text{[Equation 9]}$$

In [Equation 8] and [Equation 9], V is an energy-delay trade-off parameter. As the value of the parameter V increases, the power of the CPU may be controlled to a minimum level. As the value of the parameter V decreases, a time delay is controlled to be decreased. $P^p(s(\tau))$ represents the power consumption of the processor at a processing speed $s(\tau)$, $Q^p(\tau)$ represents the length of the processor-related queue at time $\tau$, $\lambda$ represents the number of cycles per bit that the processor can process, $Q^n(\tau)$ represents the length of the network module-related queue at time $\tau$, and min(A, B) represents a function of outputting the smaller value between A and B.

$P^n(l(\tau))$ represents the power consumption of the network module in a wireless network $l(\tau)$, $Q^n(\tau)$ represents the length of the network module-related queue at time $\tau$, and $\mu_l(\tau)$ represents the transmission rate of the wireless network $l(\tau)$ to which the UE is to be connected.

[Equation 8], which is considered in the processor module, means that a CPU clock speed minimizing [Equation 8] is selected from among CPU clock speeds available to the processor module. Specifically, Equation (8) reflects the trade-off relationship between reduction of power consumption by selecting an $s(\tau)$ as small as possible, and reduction of the CPU-related queue by selecting an $s(\tau)$ as large as possible if the processor-related queue is longer than the network module-related queue. A weight for a term for reducing power consumption in the processor may be determined by controlling the parameter V.

For example, if the CPU-related queue is shorter than the network module-related queue, this means that the processing speed (e.g. uplink speed) of a currently selected (or connected) wireless network is lower than the processing speed of the CPU-related queue. If the current processing speed of the CPU-related queue is kept, the length of the network module-related queue may be increased progressively to a saturation state. Accordingly, it is preferred to minimize the processing speed of the CPU-related queue, that is, the clock speed of the CPU in order to narrow the difference between the CPU-related queue and the network module-related queue. As a consequence, the power consumption of the CPU is decreased.

In another example, if the CPU-related queue is longer than the network module-related queue, this means that the processing speed (e.g. uplink speed) of a currently selected (or connected) wireless network is faster than the processing speed of the CPU-related queue. If the current processing speed of the CPU-related queue is kept, the length of the CPU-related queue may be increased progressively to a saturation state. Accordingly, it is preferred to increase the processing speed of the CPU-related queue, that is, the clock speed of the CPU in order to narrow the difference between the CPU-related queue and the network module-related queue. As a consequence, the power consumption of the CPU is increased, thus requiring an appropriate control.

[Equation 9], which is considered in the network module, means that a network is selected from among networks available to the network module to minimize [Equation 9]. Specifically, [Equation 9] reflects the trade-off between use of a network using power as small as possible (the first term) and reduction of the length of the network module-related queue by using a network that can transmit more data. A weight for a term for reducing power consumption in the network module may be determined by controlling the parameter V.

The network module selects a wireless network supporting a maximum rate or a wireless network minimizing the power of the network module from among available wireless networks, $l(t) \subset \{0, \text{WiFi}, \text{Cellular} \ldots\}$. If [Equation 9] is 0 or a positive-signed number using a delay-tolerating application, a wireless network is preferably not selected.

To select a wireless network for data transmission, the UE should estimate the state of a current wireless network. Basically, the UE may measure the strength of a pilot signal (e.g. a reference signal) from a cellular BS or the strength of a beacon signal from a Wi-Fi AP. However, since the number of UEs that are uploading to the current cellular BS or Wi-Fi AP may vary, the UE cannot accurately estimate a UL throughput that it may achieve, simply based on information about the signal strength. In this context, the following UL throughput estimation method is proposed.

Figure 5:
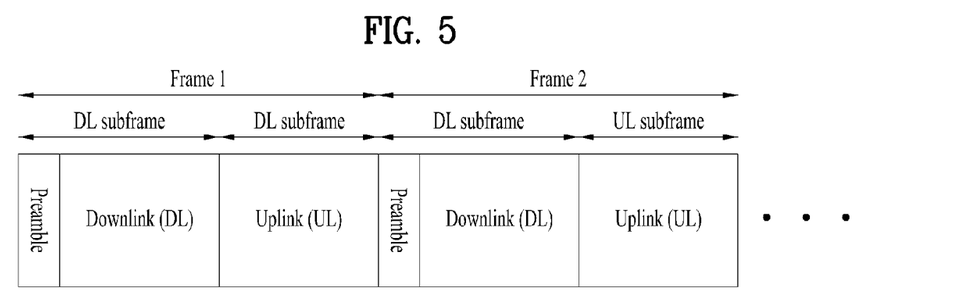
FIG. 5 illustrates an Institute of Electrical and Electronics Engineers (IEEE) 802.16m radio frame.
Figure 6:
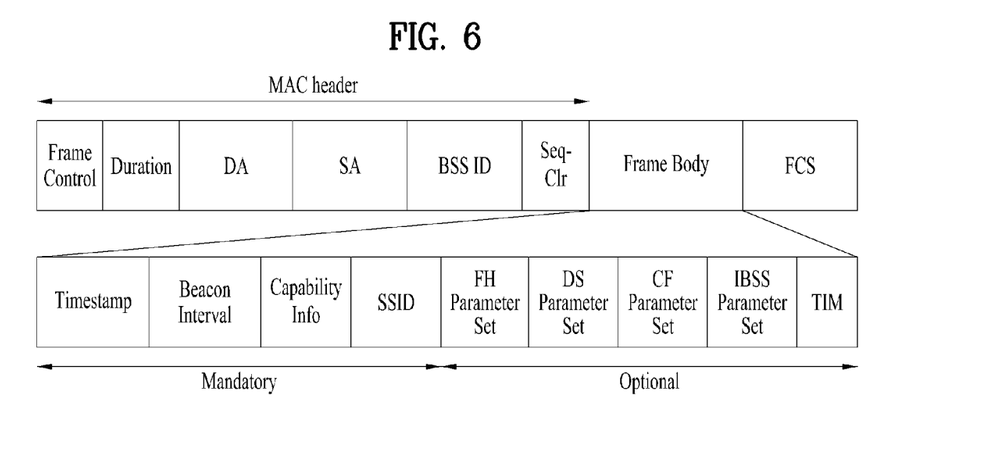
FIG. 6 illustrates a Wireless Fidelity (Wi-Fi) radio frame.

FIG. 5 illustrates an IEEE 802.16m radio frame and FIG. 6 illustrates a Wi-Fi radio frame.

In IEEE 802.16m, a pilot signal carries scheduling information in a preamble frame preceding a DL frame and a UL frame. The pilot signal may further deliver information about the number of UEs that are currently using uplink. In a Wi-Fi network, an AP broadcasts a beacon signal every 100 msec. Regarding a beacon signal frame, there is a part for setting an additional parameter in an optional frame. Information about the number of UEs currently connected to the Wi-Fi network may be carried in the part.

Under the condition that a UL throughput should be estimated based on channel information about a current network and the number of UEs connected to the network, UL throughput information obtained by transmitting UL dummy data previously may be used to estimate a current UL throughput. Specifically, a session is divided into a training session and a use session. UL throughput information is acquired by transmitting dummy data to current available networks in the training session and UL channel information and the number of UL UEs at the moment are recorded together in a mapping table. In the presence of current channel information and the number of UEs in the mapping table, a current throughput may be estimated based on the throughput recorded in the table in the use session.

Figure 7:
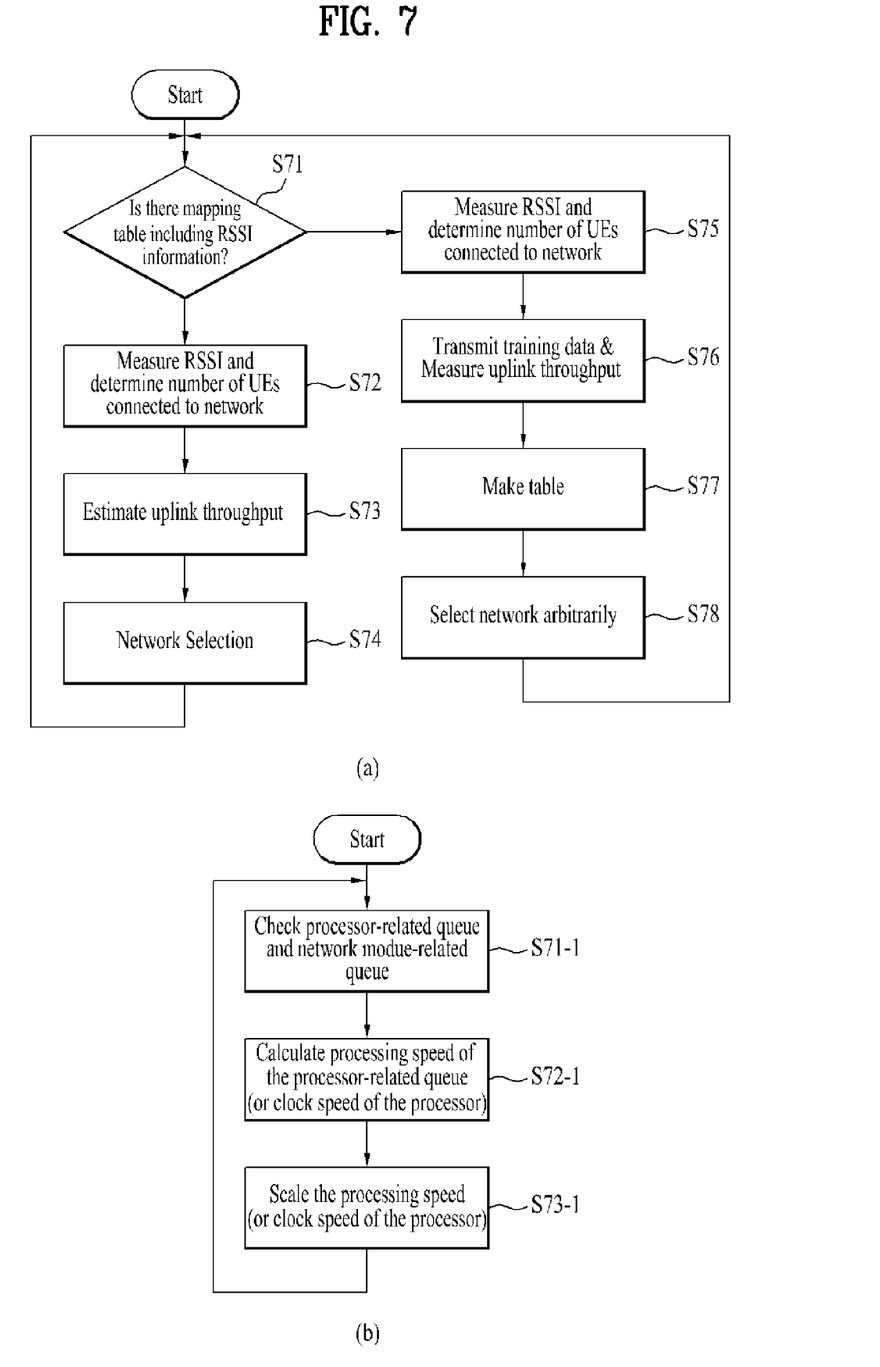
FIG. 7 is an exemplary flowchart illustrating operations of a User Equipment (UE) according to an embodiment of the present invention.

FIG. 7 is an exemplary flowchart illustrating operations of a UE according to an embodiment of the present invention. FIG. 7(a) illustrates an operation of a network module (e.g. a transceiver) in the UE and FIG. 7(b) illustrates an operation of a processor (e.g. a controller) in the UE. For the convenience of description, it is said that the embodiment illustrated in FIG. 7(a) and FIG. 7(b) is implemented by the "UE", not the network module or the processor.

Referring to FIG. 7(a), the UE may determine whether a mapping table that maps UL throughputs to the types of wireless networks and the Received Signal Strength Indicators (RSSIs) of signals through the wireless networks is stored in a storage (e.g. a memory) (S71).

In the presence of the mapping table, the UE may measure the RSSI of a DL signal received from a BS or an AP and obtains information about the number of UEs using uplink at the moment (S72). The number of UEs may be determined as done in the embodiment of the present invention illustrated in FIG. 5 or FIG. 6. The UE may select the UL throughput of a wireless network connected to the UE in the mapping table based on the measured RSSI and the number of UEs (S73). In the case where information accurately matching to the measured RSSI and the number of UEs is not included in the mapping table, the UE may detect a most similar RSSI-UE number pair and estimate the UL throughput of the currently connected wireless network based on the detected RSSI-UE number pair. Subsequently, the UE may select an appropriate wireless network through specific modeling based on the estimated UL throughput, as described before (S74).

On the contrary, in the absence of the mapping table, the UE should create a new mapping table. Therefore, the UE may measure the RSSIs of DL signals from BSs or APs and obtains the numbers of UEs using uplink at the moment of measurement (S75). The UE may pair the measured RSSIs with the numbers of UEs and temporarily store the pairs. Then the UE transmits training data on uplink and measure UL throughputs at the moment (S76). The UE creates a table by mapping the temporarily stored information about the measured RSSIs and the numbers of UEs to the measured UL throughputs (S77). While not shown, the UE may repeat training data transmission and UL throughput measurement periodically. Since the mapping table is used as a database for selection of an appropriate network, the mapping table preferably includes information about every available wireless network. Subsequently, the UE may select a network arbitrarily (S78).

Referring to FIG. 7(b), the UE may check the states of the processor-related queue and the network module-related queue (S71-1). The UE may calculate the clock frequency of the processor or the processing speed of the processor-related queue, which can keep the difference between the lengths of the two queues at or below a predetermined value and minimize the power consumption of the processor and/or the network module, based on the determined states of the two queues (S72-1). The UE may adjust the clock frequency of the processor to the calculated clock frequency of the processor or the calculated processing speed of the processor-related queue (S73-1).

Figure 8:
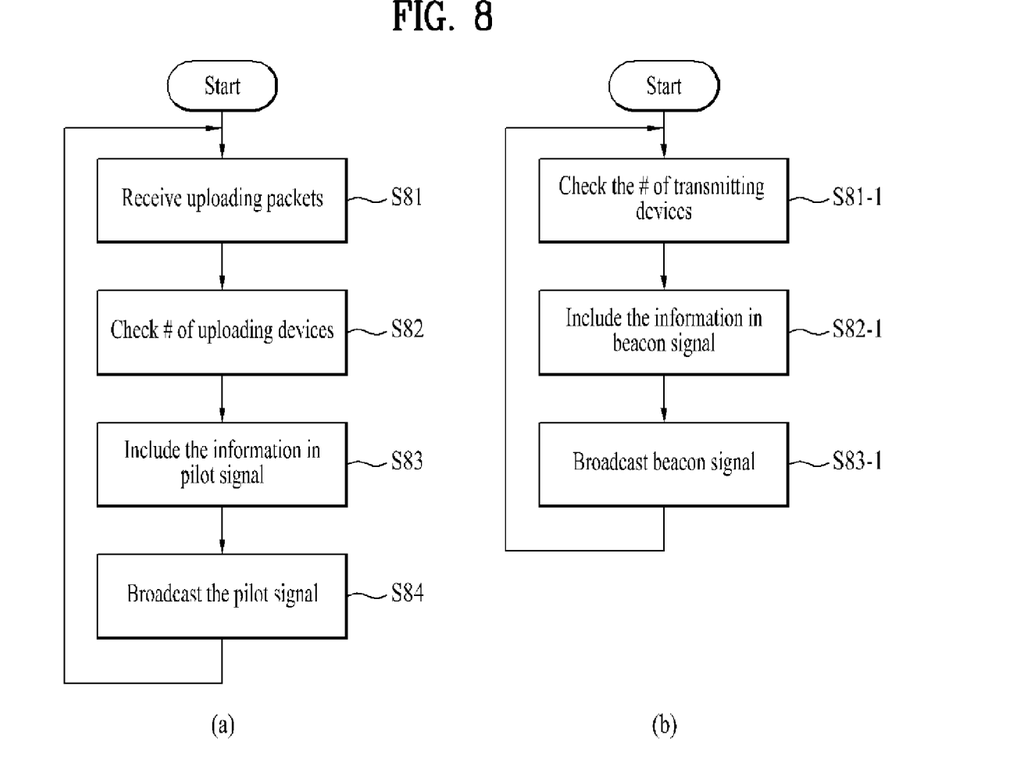
FIG. 8 is an exemplary flowchart illustrating operations of a Base Station (BS) according to an embodiment of the present invention.

FIG. 8 is an exemplary flowchart illustrating operations of a BS according to an embodiment of the present invention. FIG. 8(a) illustrates an operation of a BS conforming to the IEEE 802.16m standard. The BS may receive UL (upload) packets or data from at least one UE (S81). The UL packets or data may be training data described before with reference to FIG. 7. The BS may determine the number of UL UEs, that is, the number of UEs that are transmitting UL packets or data to the BS, based on the received UL packets or data (S82). Subsequently, the BS may include information about the number of UEs in a DL signal, for example, in a pilot signal (S83). The BS may transmit or broadcast the pilot signal to the at least one UE (S84). The at least one UE may estimate the UL throughput of the wireless network based on the pilot signal.

FIG. 8(b) illustrates an operation of an AP conforming to the Wi-Fi standard. The AP may determine the number of UL UEs, that is, the number of UEs that are transmitting UL packets or data to the AP (S81-1). Subsequently, the AP may include information about the number of UEs in a DL signal, for example, in a beacon signal (S82-1). The AP may transmit the beacon signal to the UEs (S83-1). The UEs may estimate the UL throughput of the wireless network based on the beacon signal.

Figure 9:
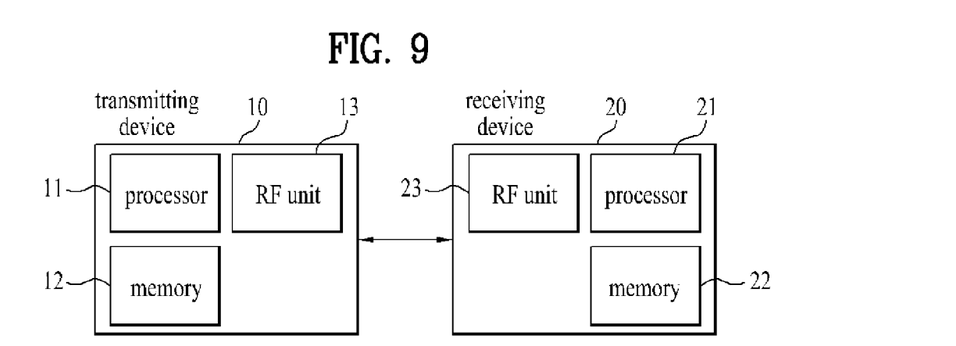
FIG. 9 is a block diagram of devices that can implement embodiments of the present invention.

FIG. 9 is a block diagram of devices configured to perform UL transmission-related operations according to an embodiment of the present invention. Referring to FIG. 9, a transmitting device 10 and a receiving device 20 include RF units 13 and 23 for transmitting or receiving information and/or data, signals, and messages, memories 12 and 22 for storing information related to communication in a wireless communication system, and processors 11 and 21 connected to components such as the RF units 13 and 23 and the memories 12 and 22 in terms of operations, for controlling the memories 12 and 22 and/or the RF units 13 and 23 to perform at least one of the foregoing embodiments of the present invention.

The memories 12 and 22 may store processing and control programs and may temporarily store input/output information. The memories 12 and 22 may be used as buffers.

The processors 11 and 21 provide overall control to each module in the transmitting device 10 and the receiving device 20. Particularly, the processors 11 and 21 may perform control functions to implement the present invention. The processors 11 and 21 may also be called controllers, microcontrollers, micro-processors, micro-computers, etc. The processors 11 and 21 may be configured in hardware, firmware, software, or a combination thereof. In a hardware configuration, the processors 12 and 22 may include Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. In a firmware or software configuration, firmware or software may be implemented in the form of a module, a procedure, a function, etc. The firmware or software may be included in the processors 11 and 21, or stored in the memories 12 and 22 and executed by the processors 11 and 21.

The processor 11 of the transmitting device 10 encodes and modulates a transmission signal and/or data scheduled by the processor 11 or a scheduler connected to the processor 11 in predetermined coding and modulation schemes and transmits the coded and modulated signal and/or data to the RF unit 13. For example, the processor 11 converts a transmission data stream to K layers after demultiplexing, channel coding, scrambling, modulation, etc. The coded data stream is referred to as a codeword equivalent to a transport block being a data block provided by a Medium Access Control (MAC) layer. One transport block is encoded to one codeword and each codeword is transmitted in the form of one or more layers to a receiving device. The RF unit 13 may include an oscillator, for frequency upconversion. The RF unit 13 may include $N_t$ transmission antennas ($N_t$ is a positive integer).

The receiving device 20 reversely performs the signal process of the transmitting device 10. The RF unit 23 of the receiving device 20 receives a radio signal from the transmitting device 10 under the control of the processor 21. The RF unit 23 may include $N_r$ reception antennas ($N_r$ is a positive integer). The RF unit 23 downconverts the frequency of a signal received through each reception antenna to a baseband signal. The RF unit 23 may include an oscillator for frequency downconversion. The processor 21 may recover original data transmitted by the transmitting device 10 by decoding and demodulating radio signals received through the reception antennas.

The RF units 13 and 23 each include one or more antennas. Each of the RF units 13 and 23 corresponds to the afore-described network module. The antennas transmit signals processed by the RF units 13 and 23 or receive radio signals and provide the received signals to the RF units 13 and 23 under the control of the processors 11 and 21 according to an embodiment of the present invention. Antennas may be referred to as antenna ports. Each antenna may correspond to one physical antenna or may be configured as a combination of two or more physical antenna elements. A signal received through each antenna may not be decomposed further in the receiving device 20. A reference signal transmitted in correspondence with an antenna defines the antenna from the perspective view of the receiving device 20. The reference signal enables the receiving device 20 to perform channel estimation in relation to the antenna, irrespective of whether a channel is a single radio channel from one physical antenna or a composite channel from a plurality of physical antenna elements included in the antenna. That is, an antenna is defined in such a manner that a channel carrying a symbol from the antenna may be derived from a channel carrying a different symbol from the same antenna. If an RF unit supports Multiple Input Multiple Output (MIMO) that transmits and receives data through a plurality of antennas, the RF unit may be connected to two or more antennas.

In embodiments of the present invention, a UE or a relay operates as the transmitting device 10 on UL and as the receiving device 20 on DL. In embodiments of the present invention, a BS operates as the receiving device 20 on UL and as the transmitting device 10 on DL.

The afore-described embodiments of the present invention may be applied independently or two or more of them may be applied in combination to the specific configuration of a UE or a BS that functions as a receiving device or a transmitting device The present invention is applicable to a wireless communication device such as a UE, a relay, a BS, etc.

As is apparent from the above description, the power consumption of a UE can be minimized, while a data processing speed is kept at a predetermined level according to the above embodiments of the present invention.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. The above embodiments are therefore to be construed in all aspects as illustrative and not restrictive. Therefore, the present invention intends not to limit the embodiments disclosed herein but to give a broadest range matching the principles and new features disclosed herein.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, eNode B (eNB), AP, etc.

The embodiments of the present invention may be achieved by various means, for example, hardware, firmware, software, or a combination thereof. In a hardware configuration, an embodiment of the present invention may be achieved by one or more ASICs, DSPs, DSDPs, PLDs, FPGAs, processors, controllers, micro-controllers, micro-processors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for selecting a processing speed of a processor and a wireless network to be connected in a mobile terminal in a wireless communication system, the method comprising:
    detecting, by the mobile terminal, states of a processor-related queue and a network module-related queue; and
    selecting, by the mobile terminal, a processing speed of the processor-related queue and a wireless network to be connected,
    wherein the processing speed of the processor-related queue is selected based on an energy-delay trade-off parameter V, a power consumption of the processor $P^p(s(\tau))$ at the processing speed $s(\tau)$ at time $\tau$, a length of the processor-related queue $Q^p(\tau)$ at the time $\tau$, a number of cycles per bit $\lambda$ that the processor can process, and a length of the network module-related queue $Q^n(\tau)$ at the time $\tau$.

2. The method according to claim 1,
    wherein the wireless network to be connected is selected based on V, $Q^n(\tau)$, a power consumption of the network module $P^n(l(\tau))$ in the wireless network $l(\tau)$ at the time $\tau$, and a transmission rate $\mu_l(\tau)$ of the wireless network $l(\tau)$ at the time $\tau$.

3. The method according to claim 1, further comprising measuring a channel state of at least one candidate wireless network to select the wireless network to be connected.

4. The method according to claim 1, wherein the processing speed of the processor-related queue, $s(\tau)$ is selected to minimize $$VP^p(s(\tau)) - 2Q^p(\tau)\frac{s(\tau)}{\lambda} + 2Q^n(\tau)\min\left(\frac{s(\tau)}{\lambda}, Q^p(\tau)\right),$$

where min(A, B) is a smaller value between A and B.

5. The method according to claim 2, wherein the wireless network to be connected, $l(\tau)$ is selected to minimize $VP^n(l(\tau))-2Q^n(\tau)\mu_l(\tau)$.

6. A mobile terminal for selecting a processing speed of a processor and a wireless network to be connected in a wireless communication system, the mobile terminal comprising:
    a Radio Frequency (RF) unit; and
    a processor configured to control the RF unit,
    wherein the processor is configured to detect states of a processor-related queue and a network module-related queue, and select a processing speed of the processor-related queue and a wireless network to be connected,
    wherein the processing speed of the processor-related queue is selected based on an energy-delay trade-off parameter V, a power consumption of the processor $P^p(s(\tau))$ at the processing speed $s(\tau)$ at time $\tau$, a length of the processor-related queue $Q^p(\tau)$ at the time $\tau$, a number of cycles per bit $\lambda$ that the processor can process, and a length of the network module-related queue $Q^n(\tau)$ at the time $\tau$.

7. The mobile terminal according to claim 6,
    wherein the wireless network to be connected is selected based on V, $Q^n(\tau)$, a power consumption of the network module $P^n(l(\tau))$ in the wireless network $l(\tau)$ at the time $\tau$, and a transmission rate $\mu_l(\tau)$ of the wireless network $l(\tau)$ at the time $\tau$.

8. The mobile terminal according to claim 6, wherein the processor is configured to measure a channel state of at least one candidate wireless network to select the wireless network to be connected.

9. The mobile terminal according to claim 6, wherein the processor is configured to select the processing speed of the processor-related queue, $s(\tau)$ to minimize $$VP^p(s(\tau)) - 2Q^p(\tau)\frac{s(\tau)}{\lambda} + 2Q^n(\tau)\min\left(\frac{s(\tau)}{\lambda}, Q^p(\tau)\right),$$

where min(A, B) is a smaller value between A and B.

10. The mobile terminal according to claim 7, wherein the processor is configured to select the wireless network to be connected, $l(\tau)$ to minimize $VP^n(l(\tau))-2Q^n(\tau)\mu_l(\tau)$.

11. The method according to claim 1,
    wherein the processing speed of the processor-related queue and the wireless network to be connected are selected to keep a difference between $Q^p(\tau)$ and $Q^n(\tau)$ at a predetermined value and minimize $P^p(s(\tau))$ and $P^n(l(\tau))$.

12. The mobile terminal according to claim 6,
    wherein the processing speed of the processor-related queue and the wireless network to be connected are selected to keep a difference between $Q^p(\tau)$ and $Q^n(\tau)$ at a predetermined value and minimize $P^p(s(\tau))$ and $P^n(l(\tau))$.

* * * * *